(12) United States Patent
Vitulli

(10) Patent No.: US 9,414,658 B2
(45) Date of Patent: Aug. 16, 2016

(54) INTEGRALLY MOLDED ONE-PIECE CARRYING HANDBAG

(71) Applicant: RALLYE FOOTWEAR INC., Ville d'Anjou (CA)

(72) Inventor: Pardo Vitulli, Riviere-des-Prairies (CA)

(73) Assignee: RALLYE FOOTWEAR INC., Ville d'Anjou (CA)

( * ) Notice: Subject to any disclaimer, the term of this patent is extended or adjusted under 35 U.S.C. 154(b) by 68 days.

(21) Appl. No.: 14/134,446

(22) Filed: Dec. 19, 2013

(65) Prior Publication Data
US 2015/0114529 A1    Apr. 30, 2015

(30) Foreign Application Priority Data

Oct. 30, 2013  (CA) ..................................... 2832079

(51) Int. Cl.
| | | |
|---|---|---|
| A45C 3/06 | (2006.01) | |
| B29C 45/00 | (2006.01) | |
| B29D 22/00 | (2006.01) | |
| B29K 19/00 | (2006.01) | |
| B29K 27/06 | (2006.01) | |
| B29K 31/00 | (2006.01) | |
| B29L 31/00 | (2006.01) | |

(52) U.S. Cl.
CPC ............... *A45C 3/06* (2013.01); *B29C 45/0055* (2013.01); *B29D 22/003* (2013.01); *B29C 45/00* (2013.01); *B29K 2019/00* (2013.01); *B29K 2027/06* (2013.01); *B29K 2031/04* (2013.01); *B29L 2031/742* (2013.01)

(58) Field of Classification Search
CPC ............ A45C 3/06; A45C 3/04; A45C 13/12; A45C 13/1042
USPC ............................. 150/118, 127; 292/DIG. 50
See application file for complete search history.

(56) References Cited

U.S. PATENT DOCUMENTS

| | | | | |
|---|---|---|---|---|
| 2,786,558 A | * | 3/1957 | Benkoe .................... | A45C 5/00 190/114 |
| 2,868,254 A | * | 1/1959 | Saad ........................ | A45C 1/02 150/150 |

(Continued)

FOREIGN PATENT DOCUMENTS

| | | |
|---|---|---|
| CN | 1438158 | 8/2003 |
| CN | 101902933 | 12/2010 |

OTHER PUBLICATIONS

European Search Report, EPO form 1507N, Mar. 5, 2015, Munich, Germany.

*Primary Examiner* — Sue A Weaver
(74) *Attorney, Agent, or Firm* — Norton Rose Fulbright Canada LLP

(57) ABSTRACT

An integrally molded one-piece carrying handbag of flexible plastics material and its method of manufacture are described. The integrally molded plastic handbag has a containment space defined by a bottom wall and a circumferential sidewall with carrying straps integrally molded in a top edge of opposed sections of the sidewall. A latch tab is also integrally formed with one of the opposed sides sections of the sidewall and has a fastener formation projecting adjacent a free end thereof. A fastener hole is provided in the other of the side sections for receiving the fastener formation to partially close the open top end of the containment space. In a preferred embodiment gusset formations are formed in opposed top ends of end wall sections of the circumferential side wall of the containment space.

12 Claims, 9 Drawing Sheets

(56) References Cited

U.S. PATENT DOCUMENTS

| | | | | |
|---|---|---|---|---|
| 2,979,844 A | * | 4/1961 | Lattuca | A45C 3/04 217/122 |
| 3,063,487 A | | 11/1962 | Mullin | |
| 3,160,186 A | | 12/1964 | Conley | |
| 3,180,385 A | | 4/1965 | Shigeharu | |
| 3,299,440 A | * | 1/1967 | Grable | A41B 13/10 2/49.1 |
| 3,685,620 A | * | 8/1972 | Schneider | A45C 3/00 190/114 |
| 3,756,300 A | * | 9/1973 | Nalle, Jr. | B29B 13/023 264/292 |
| 3,764,433 A | | 10/1973 | Schneider | |
| 4,285,067 A | * | 8/1981 | David | A41D 1/205 2/46 |
| 4,650,625 A | | 3/1987 | Pentlow | |
| 4,682,692 A | * | 7/1987 | Kessler | A45C 3/04 150/102 |
| 5,671,010 A | * | 9/1997 | Shimbo | G04F 13/02 348/157 |
| 6,361,210 B2 | | 3/2002 | Denko | |
| 6,508,587 B1 | | 1/2003 | Byers | |
| D576,793 S | * | 9/2008 | Norsa | D3/234 |
| 7,926,525 B2 | | 4/2011 | Vaccarella | |
| 8,312,816 B2 | | 11/2012 | Vaccarella | |
| 2003/0205840 A1 | | 11/2003 | Hottenroth et al. | |
| 2005/0274668 A1 | * | 12/2005 | Lee | B09B 3/00 210/603 |
| 2008/0199107 A1 | | 8/2008 | Nicholson | |
| 2009/0255612 A1 | | 10/2009 | Sitek | |
| 2010/0251516 A1 | * | 10/2010 | Yoo | A45C 13/26 16/110.1 |
| 2012/0085774 A1 | * | 4/2012 | Luburic | B65D 25/32 220/754 |
| 2013/0074999 A1 | | 3/2013 | Vaccarella | |
| 2013/0087423 A1 | | 4/2013 | Bettua et al. | |
| 2013/0233660 A1 | | 9/2013 | Bettua et al. | |

* cited by examiner

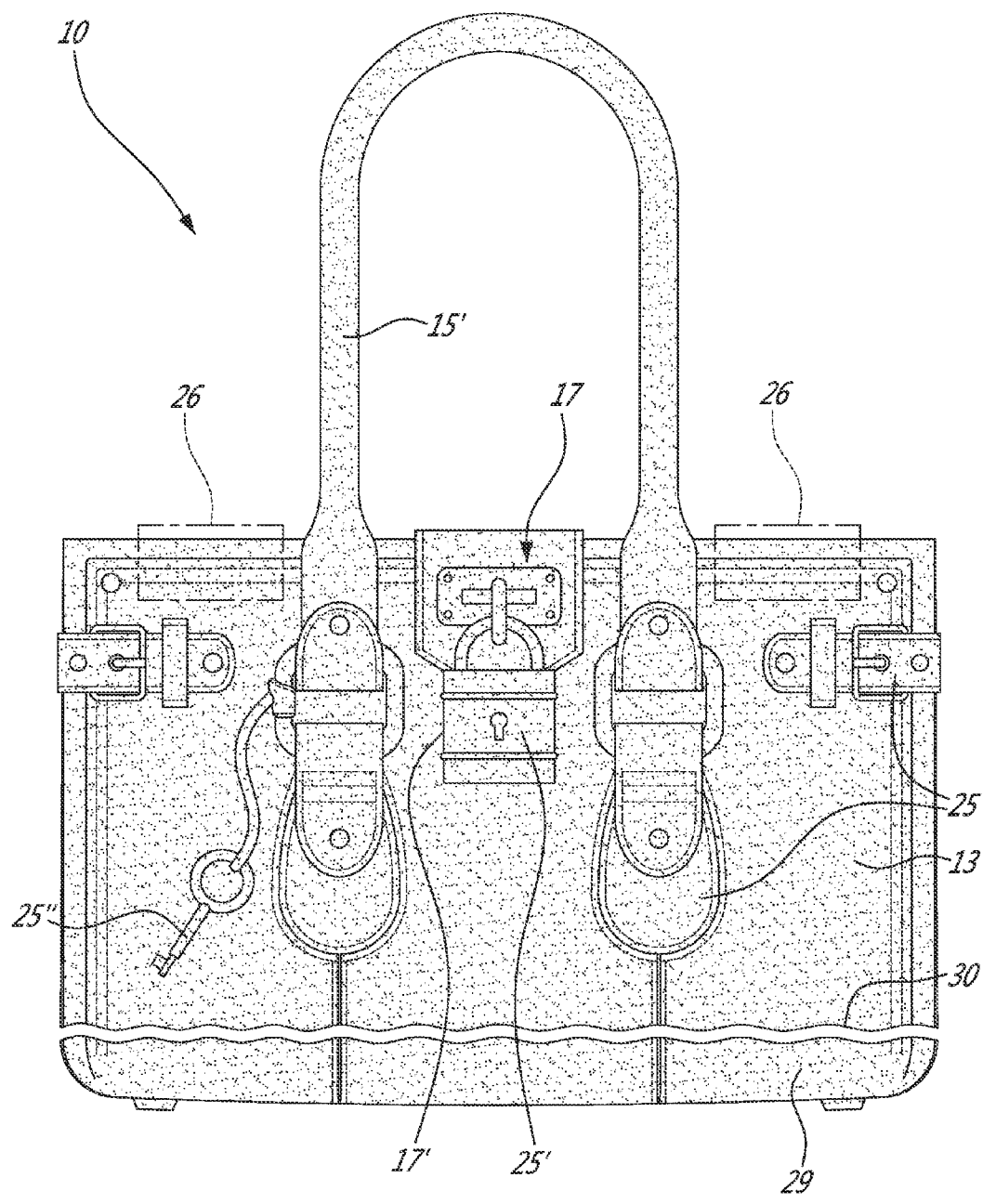

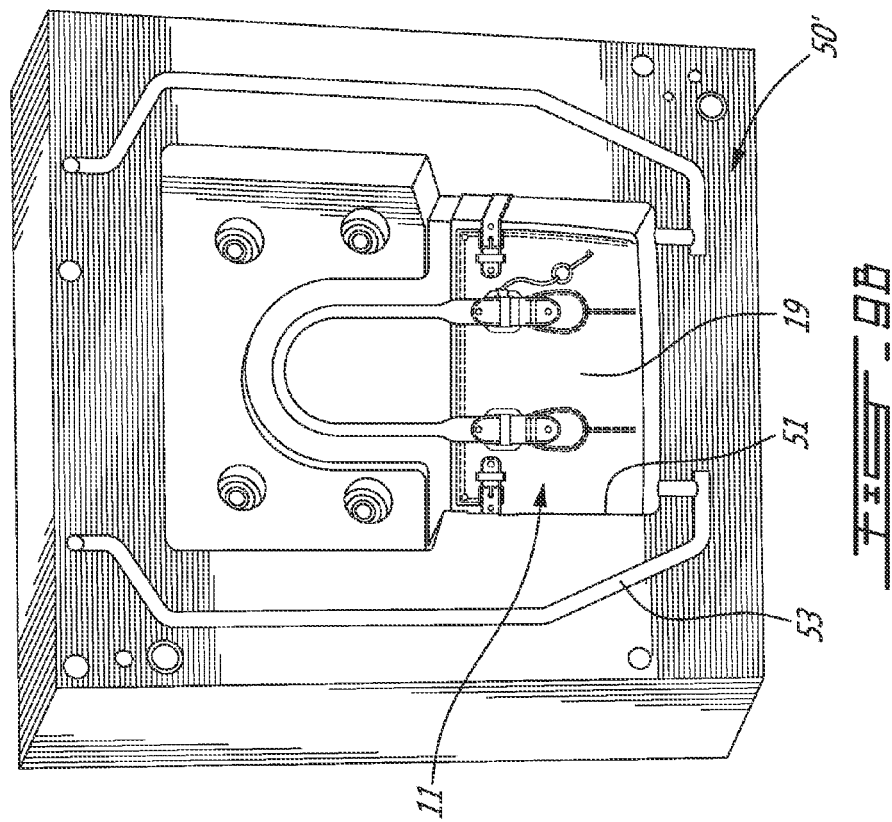
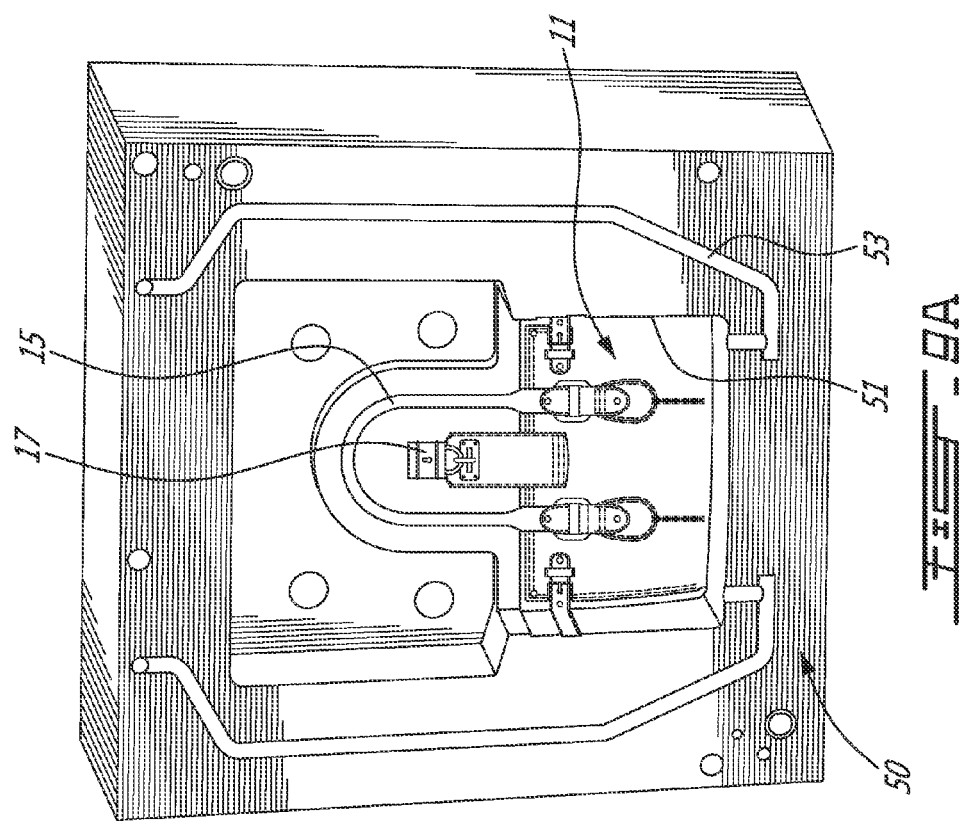

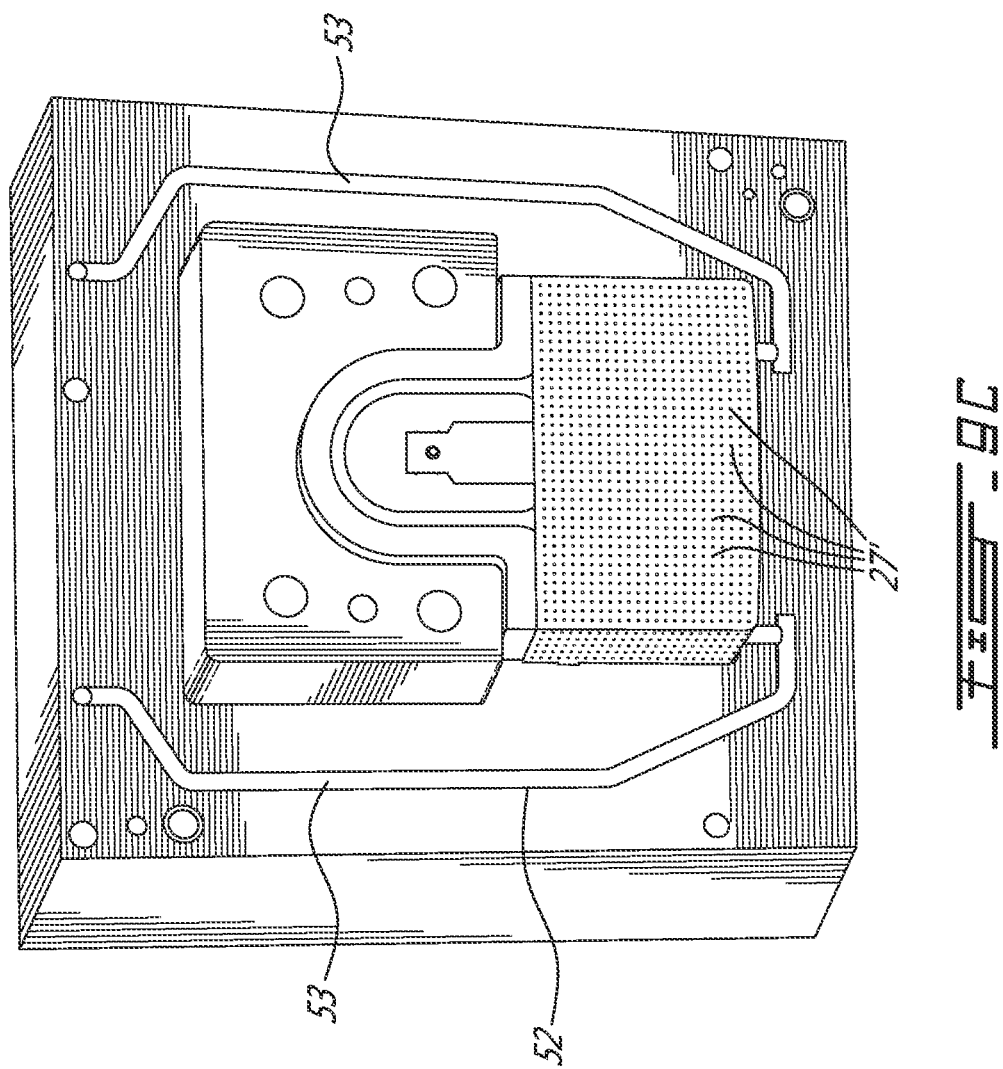

INTEGRALLY MOLDED ONE-PIECE CARRYING HANDBAG

TECHNICAL FIELD

The present invention relates to an integrally molded, one-piece, carrying handbag and its method of manufacture.

BACKGROUND OF THE ART

Carrying handbags formed from plastics material are known. Examples of these are disclosed in U.S. Pat. Nos. 2,979,844; 3,180,385; 3,756,300 and 4,682,692. A problem with these plastics molded handbags is that they require that parts thereof be assembled to form the enclosure part of the handbag as their containment space is usually formed by ribs and sometimes webbing. Also, in the prior art often the handles require to be independently secured to the handbag by fasteners. This also applies for closure tabs which are often not integrally molded. A still further disadvantage of these handbags or baskets is that their closure tab does not adequately close the open top end of the handbags and articles can easily fall out through the partly open top end or often the side walls if the side walls are formed by ribs and have openings therein. It is also known to provide openings in the side wall of the handbag for attachments of a variety of articles. Such a handbag is for example disclosed in US Patent Publication No. 2013/0074999.

Another disadvantage of these handbags is that they are formed of plastic material which is often too rigid and do not have the pliability to imitate leather formed handbags. Still further, because of the rigidity of plastic molded handbags with open top ends is that they are not capable of closing the open end such as with a leather-type handbag. There is therefore a further desire to provide a means to ensure better closure of the open top end of heavy plastics handbags.

SUMMARY OF THE INVENTION

There is a feature of the present invention to provide an integrally molded, one-piece carrying handbag of flexible plastic material and which substantially overcomes all of the above-mentioned disadvantages of the prior art.

Another feature of the present invention is to provide an integrally molded, one-piece, carrying handbag of flexible plastic material and wherein the open top end of the handbag has gusset formations formed from a top edge in opposed end wall sections of the handbag to permit a front and rear sidewalls of the handbag to easily converge towards one another when a handbag closure is secured.

Another feature of the present invention is to provide an integrally molded, one-piece, carrying handbag of flexible EVA plastics material and wherein the handbag has integrally molded conventional handbag accessories whereby to resemble a purse and other expensive carrying handbags.

Another feature of the present invention is to provide a method of fabricating a one-piece carrying handbag formed from an ethylene vinyl acetate (EVA) material.

According to the above features, from a broad aspect, the present invention provides an integrally molded, one-piece, carrying handbag of flexible plastics material. The carrying handbag comprises a closed containment space defined by a bottom wall and a circumferential side wall terminating at an open top end. A carrying strap is integrally formed with opposed side sections of the circumferential side wall and projects from a top edge of the side sections. A latch tab is integrally formed with one of the opposed side sections and projects a predetermined distance from the top edge thereof. A fastener formation projects from an inner face of the latch tab. A fastener hole is provided in the other of the side sections and spaced at predetermined distance from the top edge thereof at a position for receiving the fastener formation and locking engagement therewith. The latch tab, when in locking engagement with the fastener hole, draws the side section towards one another, at their upper ends, to provide a partial closure of the open top end.

According to a further broad aspect of the present invention, there is provided a method of fabricating a one-piece carrying handbag from an ethylene vinyl acetate (EVA) plastics material, said method comprising the steps of:

i) injecting said EVA material in a mold having a cavity defining the one-piece carrying handbag to produce the carrying handbag having a containment space having a bottom wall, a circumferential side wall, a carrying strap projecting from a top edge of the sidewall on opposed front and rear sides thereof, and a latch tab extending from the top edge of one of the opposed sides with a fastener formation projecting from an inner face of the latch tab and a fastener hole in the other of the opposed sides, ii) permitting the one-piece handbag to cure in the mold for a predetermined period of time, iii) removing the injected molded one-piece carrying handbag from the mold to permit the EVA material to expand to a size suitable for placement on a form, iv) placing the injected molded one-piece carrying handbag on the form before the EVA material starts to contract, v) restraining the containment space, carrying straps and latch tab by form restraining formations of the form, and vi) removing the one-piece carrying handbag from the form after the EVA material has contracted and stabilized.

DESCRIPTION OF THE DRAWINGS

A preferred embodiment of the present invention will now be described with reference to the accompanying drawings, in which:

FIG. 8 is a further side view similar to FIG. 2 but showing the opposed side wall of the handbag of FIG. 2 and wherein the latch tab simulates a lock secured to the latch tab and further illustrating the position of additional latch tabs which may be secured to the open top end of the handbag to provide for a substantially full closure of the open top end;

FIGS. 9A and 9B are plan views of the female parts of the mold to form the integrally molded, one-piece, carrying handbag of the present invention;

FIG. 9C is a plan view of the male part of the mold which is positioned between the two female parts.

DETAILED DESCRIPTION OF THE PREFERRED EMBODIMENTS

Figure 1:
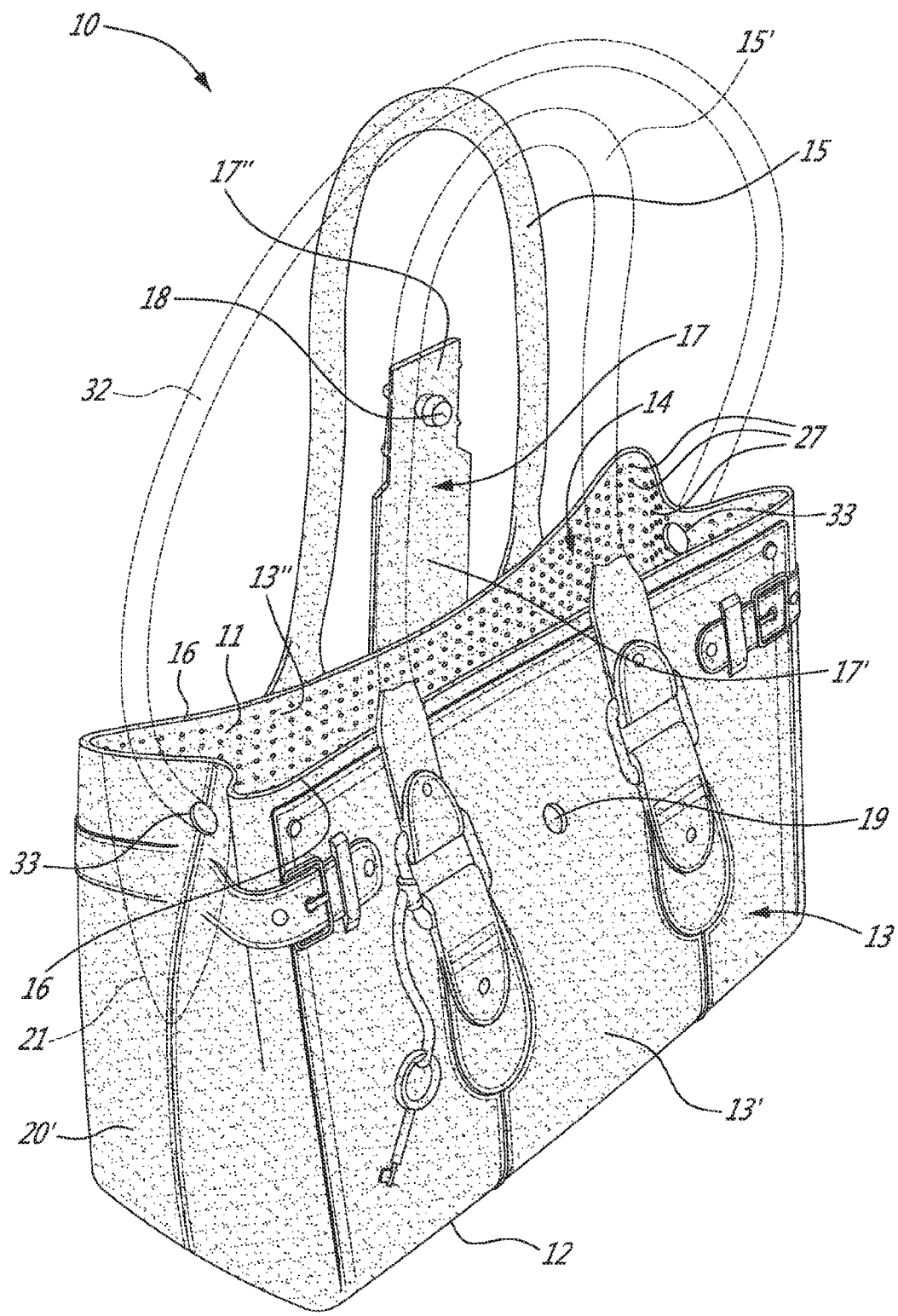
FIG. 1 is a perspective view of an integrally molded, one-piece, carrying handbag of flexible plastics material and fabricated in accordance with the present invention.

Referring now the drawings and more particularly to FIGS. 1 to 4, there is shown generally at 10 the integrally molded, one-piece carrying handbag of flexible plastics material constructed in accordance with the present invention. The carrying handbag comprises a containment space 11 defined by a bottom wall 12 and a circumferential sidewall 13 terminating at an open top end 14.

As hereinshown, a carrying strap 15 is integrally formed with opposed side sections or sidewalls 13' of the circumferential sidewall 13 and projects from a top edge 16 thereof. One of the carrying straps 15 is shown in phantom lines in FIG. 1 for better clarity of the parts. A latch tab 17 is also integrally formed with one of the opposed side sections or sidewall, herein sidewall 13" and projects a predetermined distance from the top edge 16 thereof. A fastener formation 18 projects from an inner face 17' of the latch tab 17. A fastener hole 19 is formed in the other of the side sections or sidewall 13' and positioned predetermined distance from the top edge 16 thereof, at a position for receiving the fastener formation 18 in locking engagement therewith, see FIG. 5. The latch tab, when in locking engagement with the fastener hole 19, draws the side sections 13' and 13" towards one another at their upper ends to provide a partial closure of the open top end 14.

Figure 4:
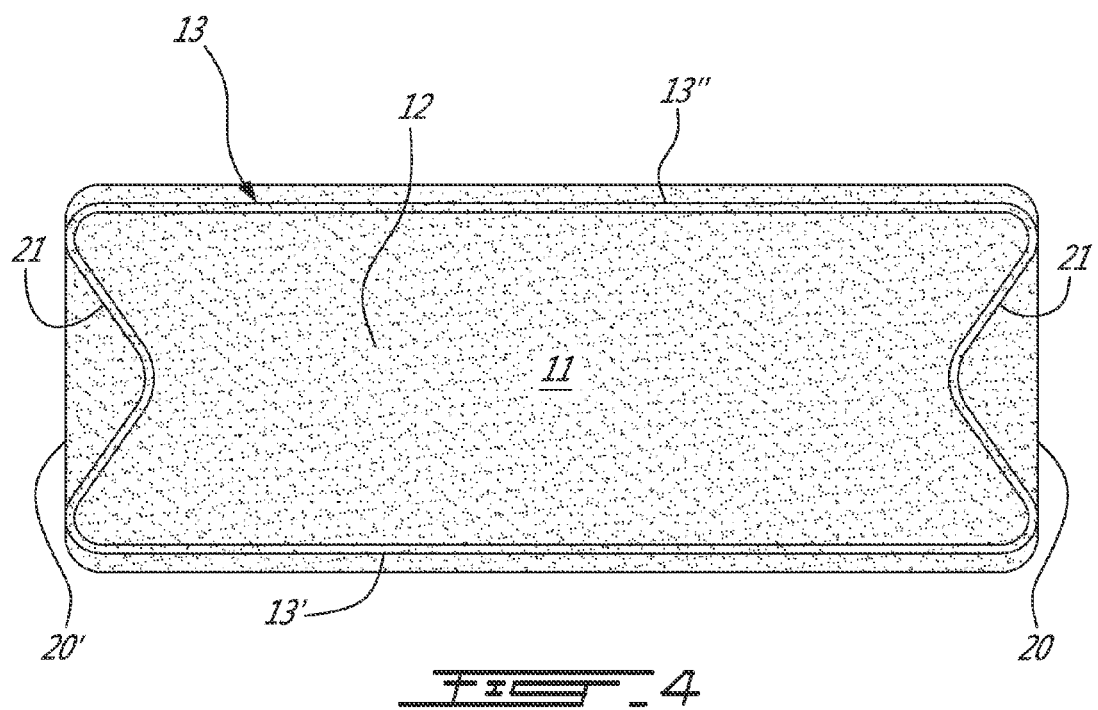
FIG. 4 is a top view of the carrying handbag containment space illustrating the gusset formations formed in a top end section of the handbag.

As shown in FIGS. 1 and 4, the circumferential sidewall 13 defines the front and rear sidewalls section 13' and 13" and opposed end wall sections 20 and 20' of the handbag. The end wall sections 20 and 20' have gusset formations 21 formed from the top edge 16 thereof to provide for the front and rear walls 13' and 13" to converge towards one another in opposed end regions of the open top end when the latch tab 17 is engaged with the fastener hole 19.

Figure 2:
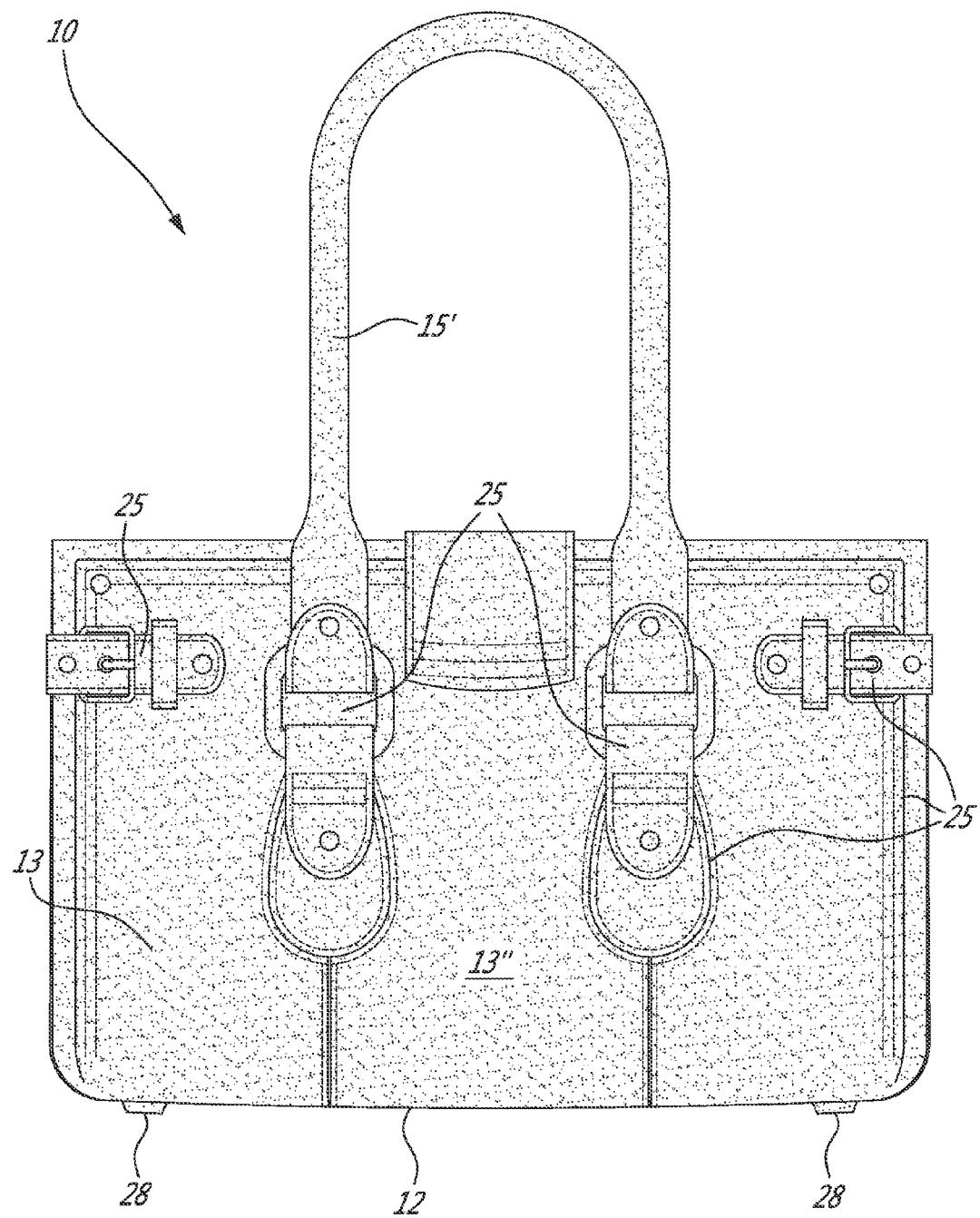
FIG. 2 is a side view showing another embodiment of integrally molded, one-piece, carrying handbag of flexible plastics material constructed in accordance with the present invention.

With reference now to FIGS. 2 and 8, it can be seen that the integrally molded, one-piece carrying handbag 10 is further provided with handbag accessory formations 25 integrally molded in the outer surfaces of the circumferential sidewall 13. These accessory formations, as hereinshown simulate straps and buckles and stitched lines to simulate a real leather carrying handbag such as a purse design shown in FIG. 2. Also, as shown in FIG. 2, the carrying strap 15' is formed differently than the carrying strap 15 as shown in FIG. 1 and this to further simulate a leather strap design. FIG. 8 is an opposed view of FIG. 2 and wherein again these accessory formations are illustrated. As also illustrated in this Figure, the latch tab 17 has accessory formations such as a lock 25' formed in the tongue section 17" of the latch tab 17. A key formation 25" is also integrally formed to simulate a key for opening the lock 25'.

In order to provide a better full closure of the open top end 14 of the handbag 10, additional closure tabs 26 may be formed integral with the side wall 13", hereinshown on opposed sides of the central latch tab 17 and have a similar fastener formations so that the open top end is substantially fully closed.

Figure 3:
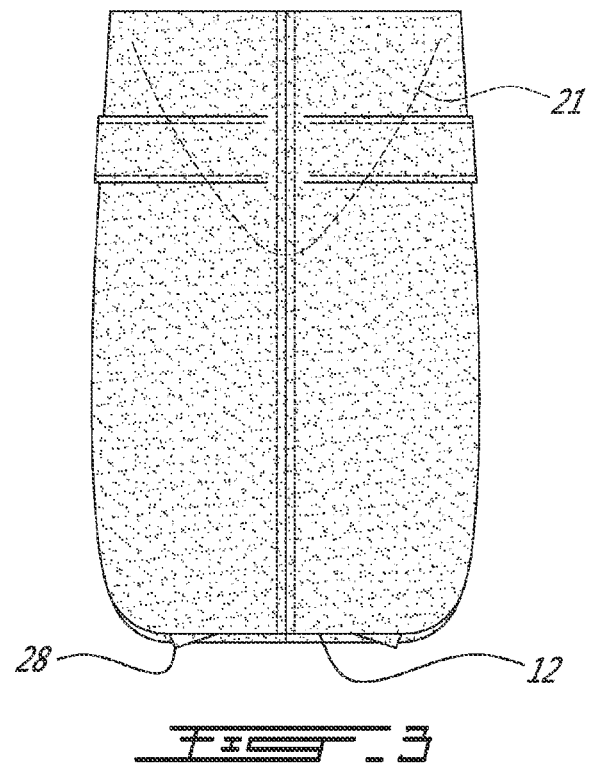
FIG. 3 is a side view of FIG. 2.

With reference to FIG. 1, there is illustrated a plurality of friction formations 27 in the form of nipples formed in the inner surface of the side wall 13" whereby to provide an arresting surface or frictional surface against materials position in the carrying handbag to prevent such materials from falling or slipping out of the handbag. Also, as shown in FIGS. 2 and 3, the bottom wall 12 of the handbag is provided with external foot supports 28 projecting outwardly thereof to maintain the bottom wall elevated from a support surface on which the handbag is disposed.

The integrally molded, one-piece, carrying handbag 10 of the present invention is preferably molded from ethylene vinyl acetate (EVA) plastics material which has good pliability. However, it is in pointed out that the handbag could also be molded from thermal plastic rubber (TPR) or poly vinyl chloride (PVC) material. All of these materials provide excellent water proof characteristics, this being a feature of the handbag when utilized as a "beach handbag". It is also noted that the handbag may be molded from at least two different colors of the flexible plastics material. For example, as shown in FIG. 8, the handbag circumferential side wall 13 may have a bottom section 29 molded from plastic of one color, a further narrow section 30 molded from a second color plastic and the remaining portions of the handbag of the circumferential side wall formed from another colored plastic.

Figure 7:
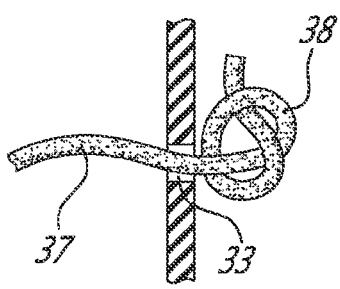
FIG. 7 is a fragmented view showing the attachment of a carrying strap detachably secured to holes provided in opposed end walls of the handbag and wherein the shoulder carrying strap is formed from the injection leader conduit molded strand.

Referring to FIG. 1, there is shown in phantom line a shoulder carrying strap 32 which is adapted for securement in opposed securement holes 33 provided in the end walls 20 and 20' of the handbag. As it will be described later, the shoulder carrying strap is formed from the leader molded strands of the molds used for molding the handbag of the present invention. The shoulder carrying strap 32, as shown in FIG. 7, is secured in the holes 33 by making a knot 38 at the end of the shoulder carrying strap 37 inside the handbag. Accordingly, most of the molded waste materials can be re-utilised.

Figure 5:
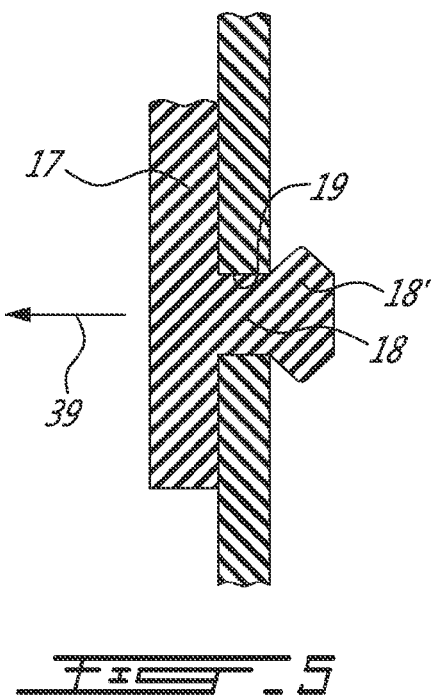
FIG. 5 is a fragmented cross-section view showing a portion of the latch tab and the fastener formation shown engaged in a fastener hole provided in the opposed side wall of the handbag.

As shown in FIG. 5, the fastener post 18 of the latch tab 17 has an enlarged head 18' at a free end thereof and this enlarged head is dimensioned for press-fitting into the fastener hole 19. The outer circumference of the enlarged head 18' maintains the latch tab 17 engaged. To disengage the tab it is simply a question of pulling the tab in the direction of arrow 39 whereby the flexible plastics material about the hole will deform permitting the enlarged head 18' to be pulled therethrough.

Figure 6A:
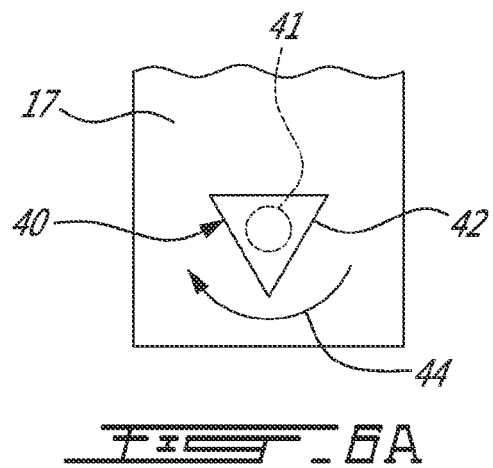
FIG. 6A is a fragmented plan view showing a different fastener formation formed in the latch tab for engagement in a further fastener hole formed in the opposed side wall of the handbag.
Figure 6B:
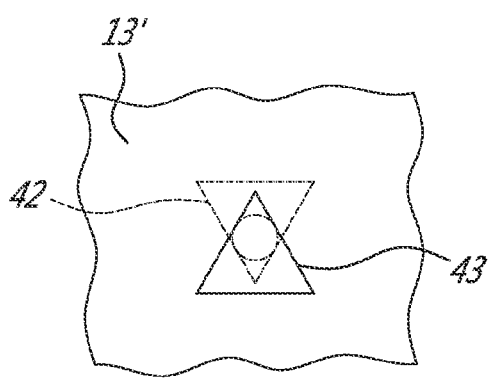
FIG. 6B is fragmented plan view showing the shape of the fastener holes and the fastener formation engaged therein.

FIGS. 6A and 6B represent another version of the fastener of the latch tab. As hereinshown, the fastener 40 has a post-section 41 projecting from the inner surface of the tab 17 and the end of the post is formed as an inverted triangular shaped enlarged flat head 42. The hole 43, see FIG. 6B, is also triangular in shape but extending in an inverted direction as the triangular shaped head 42. In order to secure the fastener formation 40 within the hole 43 it is necessary to twist the tab 17 in the direction as illustrated by arrow 44 in FIG. 6A to position the triangular head 42 in co-extensive alignment with the triangular shaped hole 43 and pushing the head 42 through the hole 43 and thereafter releasing the tab 17 which restores to its original or initial position and thereby locking the head 42 behind the hole 43, as illustrated in FIG. 6B.

With reference now FIGS. 9A to 10B, there will be described the method of fabricating the one-piece carrying handbag of the present invention from an ethylene vinyl acetate (EVA) plastics material. The female molds 50 and 50' are provided with cavities 51 and 51' which defines opposed half-sections of the containment space 11 and the carrying strap 15 and the latch tab 17 in one of the female molds and the hole 19 in the other of the female molds. The male section of the mold 52 is interposed between the two female molds 50 and 50' and defines the inner surface of the containment space of the handbag by providing cavities 27' which defines the nipples 27 in the inner surface of the handbag. As can be seen from these drawings, injection leader conduits 53 are formed in the inner surfaces of the molds and provided for the passage of the hot molten EVA plastic to the cavities 51 of the female molds and about the male mold. After the integrally molded, one-piece, carrying handbag is injected in the mold, the mold sections are separated after a predetermined cure time. The plastics material in the leader conduits 53 are cut and can be utilized to form the shoulder strap 32, as illustrated in FIG. 1, if desired.

Figure 10A:
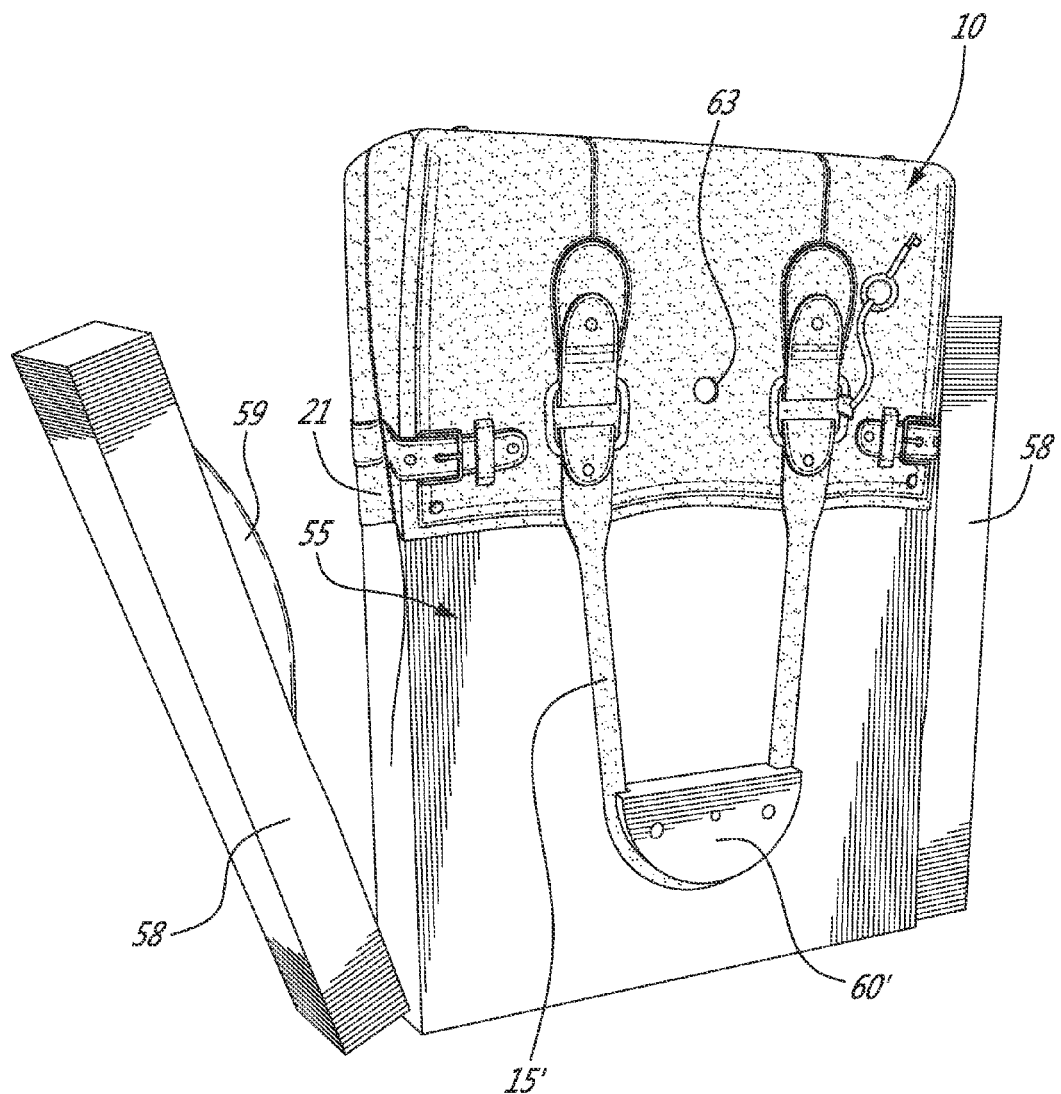
FIGS. 10A and 10B are perspective views of the mold utilized to form the integrally molded, one-piece, carrying handbag of the present invention after it comes out of the mold and which is in mouldable form whereby to form gussets in the opposed edge walls of the handbag and stabilize the shrinking of the EVA plastic.
Figure 10B:
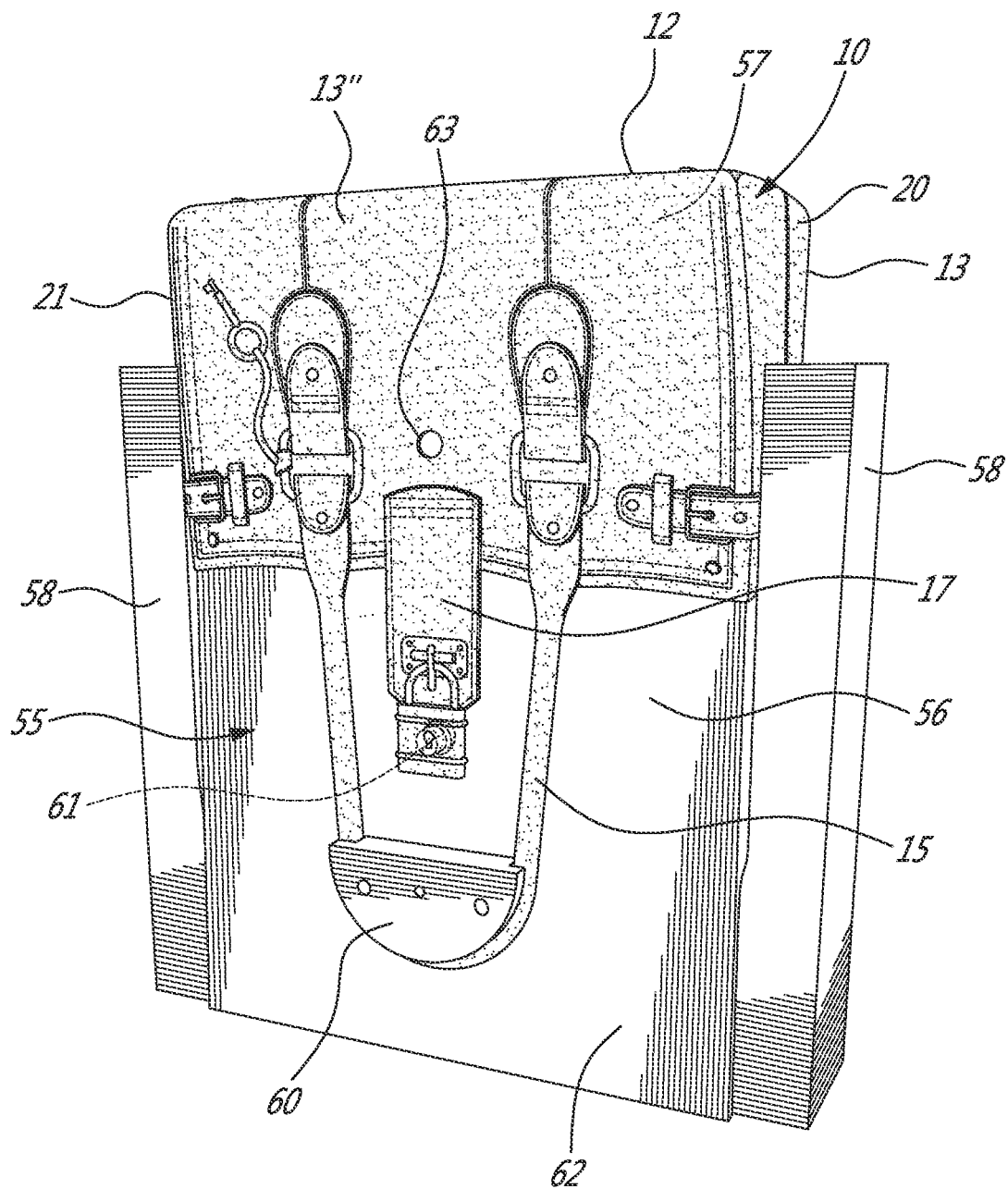

Summarizing the method of fabricating the one-piece carrying handbag 10 of the present invention with an EVA plastic material the method comprises injecting the EVA material in a mold having a cavity defining the one-piece carrying handbag to produce a carrying handbag having a containment space 11 defined as above-described. After the EVA material is injected in the mould it is left to cure for a predetermined period of time. The injected molded one-piece carrying handbag is then removed from the mold to permit the EVA material to continue to expand to a size suitable for placement on the form 55 as illustrated in FIGS. 10A and 10B. As therein shown, the form 55 is formed as a block 56 which has a handbag containment space shape 57 in a top section thereof which defines the opposed side walls 13 and 13" of the handbag and opposed end walls 20 and 21. The top end of the handbag containment space shape 57 defines the bottom wall 12 of the handbag. After the EVA expands for a predetermined time from leaving the mold, it then starts to shrink to a final size.

The form 55 also has a pair of displaceable gusset forming arms 58 which are each provided with a gusset shaped protrusion 59 in an inner face of the arms 58. These gusset forming arms 58 are secured against the injected one-piece carrying handbag 10 after it is positioned on the form 55 while it begins to shrink on the form. Suitable attachment means retains these gusset forming arms bias against the side walls 20 and 20' of the handbag positioned on the form 55. Also, the carrying straps 15 are positioned about a restraining formation 60 to restrain the carrying strap while the straps retract to assume a predetermined shape. A like formation 60' is provided on the other side of the form as shown in FIG. 10A. Further, in order to retain the latch tab 17 from over shrinking the fastener or formation 18 is disposed in a hole 61, hereinshown in phantom lines, provided in the side face 62 of the form 55. After the EVA material has stabilized the gusset forming arms 58 are retracted and air is injected inside the form 55 and released in the containment space 11 of the handbag through holes 63 in the form, as shown in phantom lines, whereby to facilitate the removal of the handbag from the form. Of course the carrying straps 15 are stretched and removed from their retaining formation 60 as well as the latch tab fastener formation removed from the hole 61.

It is within the ambit of the present invention to cover any obvious modifications of the preferred embodiment described therein provided such modifications fall within the scope of the appended claims.

The invention claimed is:

1. An integrally molded one-piece carrying handbag of flexible plastics material, said carrying handbag comprising a containment space defined by a bottom wall and a circumferential side wall terminating at an open top end, a carrying strap integrally formed with opposed side sections of said circumferential side wall and projecting from a top edge of said side sections, a latch tab integrally formed with one of said opposed side sections and projecting a predetermined distance from said top edge thereof, a fastener formation projecting from an inner face of said latch tab, a fastener hole in the other of said side sections and spaced a predetermined distance from said top edge thereof, said fastener formation being insertable into the fastener hole in said opposed side section to from a locking engagement between said latch tab and said opposed side section, said latch tab when in locking engagement with said fastener hole extending over the open top end and drawing said side sections towards one another at their upper ends to provide a partial closure of said open top end.

2. A carrying handbag as claimed in claim 1, wherein said side sections define a front and rear side wall, and opposed end walls, said end walls having gusset formations formed from said top edge to provide for said front and rear side walls to converge towards one another in opposed end regions of said open top end.

3. A carrying handbag as claimed in claim 2, wherein there is further provided handbag accessory formations integrally formed on an outer surface of said circumferential side wall and said tab.

4. A carrying handbag as claimed in claim 2, wherein an inner face of said circumferential side wall is provided with a plurality of friction formations to provide an arresting surface against material positioned in said carrying handbag, said bottom wall having foot support projecting outwardly therefrom.

5. A carrying handbag as claimed in claim 2, wherein said flexible plastics material is one of a thermoplastic rubber (TPR), a polyvinyl (PVC) and ethylene vinyl acetate (EVA), said carrying handbag being a waterproof carrying handbag.

6. A carrying handbag as claimed in claim 2, wherein a bottom region of said containment space is molded from at least two different colors of said flexible plastics material.

7. A carrying handbag as claimed in claim 2, wherein there is further provided a strap securing hole formed in each said opposed end wall sections and spaced a predetermined distance from said top edge for receiving an end portion of a shoulder carrying strap.

8. A carrying handbag as claimed in claim 7, wherein said shoulder carrying strap is secured to said strap securing hole by a knot formed at an end of said strap internally of said containment space.

9. A carrying handbag as claimed in claim 2, wherein said fastener formation is constituted by a fastener post having an enlarged head at a free end thereof dimensioned for press-fitting into said fastener hole, said head having an outer circumference larger than the circumference of said fastener hole.

10. A carrying handbag as claimed in claim 2, wherein said fastener formation is constituted by a fastener post having a triangular shaped flat head, said fastener hole being triangular in shape and disposed in opposite direction to said triangular shaped head for receiving the triangular shaped head therein by twisting said tab to align said triangular shaped head co-extensively with said triangular shaped hole disposed in opposite direction whereby upon release of said twisted tab said fastener post will restore to its initial position and lock said triangular shaped head behind said triangular shaped hole.

11. A carrying handbag as claimed in claim 8, wherein said shoulder carrying strap is formed from a plastic band from an injection leader conduit formed in said mold in which said carrying handbag is injection molded.

12. A carrying handbag as claimed in claim 1, wherein the latch tab includes two or more of latch tabs and wherein the fastener hole includes two or more fastener holes, each latch tab projecting from said top edge of one of said opposed side sections, and each fastener hole being disposed in the other of said side sections to substantially close said open top end of said containment space.

* * * * *